United States Patent
Mo et al.

(10) Patent No.: US 10,173,135 B2
(45) Date of Patent: *Jan. 8, 2019

(54) DATA PROCESSING METHOD, TERMINAL AND SERVER

(71) Applicant: Tencent Technology (Shenzhen) Company Limited, Shenzhen, Guangdong (CN)

(72) Inventors: Xichang Mo, Guangdong (CN); Liang Huang, Guangdong (CN); Chaofan Wang, Guangdong (CN); Zheng Zhang, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 159 days.

This patent is subject to a terminal disclaimer.

(21) Appl. No.: 15/652,753

(22) Filed: Jul. 18, 2017

(65) Prior Publication Data

US 2017/0312627 A1     Nov. 2, 2017

Related U.S. Application Data

(63) Continuation of application No. 15/265,605, filed on Sep. 14, 2016, now Pat. No. 9,737,806, which is a (Continued)

(30) Foreign Application Priority Data

Mar. 17, 2014   (CN) .......................... 2014 1 0098746

(51) Int. Cl.
*A63F 13/20*       (2014.01)
*A63F 13/358*      (2014.01)
(Continued)

(52) U.S. Cl.
CPC ............ *A63F 13/358* (2014.09); *A63F 13/20* (2014.09); *A63F 13/25* (2014.09); *A63F 13/52* (2014.09); *A63F 13/822* (2014.09)

(58) Field of Classification Search
CPC ........ A63F 13/30; A63F 13/355; A63F 13/42; A63F 13/70; A63F 13/77; A63F 2300/50;
(Continued)

(56) References Cited

U.S. PATENT DOCUMENTS 7,346,439 B2   3/2008  Bodin
8,002,636 B2   8/2011  Nogami et al.
(Continued)

FOREIGN PATENT DOCUMENTS

CN    1512138 A     7/2004
CN    102685196 A   9/2012
(Continued)

OTHER PUBLICATIONS

International Search Report and Written Opinion received in PCT Application No. PCT/CN2015/074359 dated Jun. 3, 2015.
(Continued)

*Primary Examiner* — Michael Cuff
(74) *Attorney, Agent, or Firm* — Brinks Gilson & Lione

(57) ABSTRACT

A data processing method includes: determining, after receiving a casting instruction input by a user for a specified skill, first-type action data corresponding to the specified skill, the first-type action data being data that can be displayed before a server makes a response; sending a data requesting message to the server, the data requesting message being used for requesting second-type action data corresponding to the specified skill, and displaying the first-type action data, the second-type action data being data that cannot be displayed until the server makes a response;
(Continued)

and receiving the second-type action data sent by the server, and displaying the second-type action data.

10 Claims, 6 Drawing Sheets

Related U.S. Application Data continuation of application No. PCT/CN2015/074359, filed on Mar. 17, 2015.

(51) Int. Cl.
*A63F 13/25* (2014.01)
*A63F 13/822* (2014.01)
*A63F 13/52* (2014.01)

(58) Field of Classification Search
CPC ............ A63F 2300/53; A63F 2300/534; A63F 2300/538
USPC ..................................................... 463/40, 42
See application file for complete search history.

(56) References Cited

U.S. PATENT DOCUMENTS

2008/0254888 A1  10/2008  Morio et al.
2013/0205220 A1  8/2013  Yerli

FOREIGN PATENT DOCUMENTS

| CN | 103297393 A | 9/2013 |
| CN | 103501287 A | 1/2014 |
| CN | 103886198 A | 6/2014 |
| JP | 2006-263069 A | 10/2006 |
| JP | 2006-304916 A | 11/2006 |
| WO | WO2015/139600 A1 | 9/2015 |

OTHER PUBLICATIONS

Office Action dated Sep. 26, 2017 for Japanese Application No. 2016-550555, 5 pages.

DATA PROCESSING METHOD, TERMINAL AND SERVER

CROSS-REFERENCE TO RELATED APPLICATIONS

The present application is a continuation application of U.S. application Ser. No. 15/265,605 filed Sep. 14, 2016, which is a continuation of Application No. PCT/CN2015/074359 filed on Mar. 17, 2015, which claims priority to Chinese Patent Application No. 201410098746.0 filed with the Chinese State Intellectual Property Office on Mar. 17, 2014, all of which are incorporated herein by reference in entirety.

FIELD OF THE TECHNOLOGY

The present disclosure relates to the field of data processing technologies, and in particular, to a data processing method, terminal and server.

BACKGROUND OF THE DISCLOSURE

With the rapid development of the Internet, online games are more and more popular among players; action games are dominating online games, and emphasize real-time interaction and smooth experience, and a processing latency should be shorter than a physical response time of a user. The processing latency is a time from the moment when the user initiates an action instruction to the moment when a system responds correspondingly. All traditional action games are of standalone versions, in which all computations and interactions are completed locally, and as long as a central processing unit (CPU) and memory meet requirements of software, it can be ensured that the processing latency is shorter than the response time of the user. However, online action games need network connections to implement synchronous interactions of different players, and inherent properties of a network, namely, latency and fluctuation, directly affect the value of the response latency in the game. Online game players are dispersed all over the country; network access conditions are complicated, and latencies and fluctuations vary significantly, making latency processing more complicated.

A long processing latency severely affects the experience of synchronous interaction in the game, causing a feeling of stickiness to the user, the feeling of stickiness is used to describe a situation in which the processing latency of a game system consisting of a terminal and a server exceeds a response time of a player, and the player feels that the game responds slowly. Consequently, communication efficiency between the user and a game application is lowered.

SUMMARY

A first aspect of the present disclosure provides a data processing method, including:

determining, after receiving a casting instruction input by a user for a specified skill, first-type action data corresponding to the specified skill, the first-type action data being data that can be displayed before a server makes a response;

sending a data requesting message to the server, the data requesting message being used for requesting second-type action data corresponding to the specified skill, and displaying the first-type action data, the second-type action data being data that cannot be displayed until the server makes a response; and receiving the second-type action data sent by the server, and displaying the second-type action data.

A second aspect of the present disclosure provides a data processing method, including:

receiving a data requesting message sent by a terminal when the terminal displays first-type action data, the data requesting message being used for requesting second-type action data corresponding to a specified skill specified by a user, the first-type action data being data that can be displayed before a server makes a response, and the second-type action data being data that cannot be displayed until the server makes a response;

determining, according to the data requesting message, the second-type action data corresponding to the specified skill; and sending the second-type action data to the terminal.

A third aspect of the present disclosure provides a terminal, including:

a receiving unit, configured to receive a casting instruction input by a user for a specified skill;

a determining unit, configured to determine first-type action data corresponding to the specified skill received by the receiving unit, the first-type action data being data that can be displayed before a server makes a response;

a sending unit, configured to send a data requesting message to the server, the data requesting message being used for requesting second-type action data corresponding to the specified skill received by the receiving unit; and a display unit, configured to display the first-type action data determined by the determining unit, the second-type action data being data that cannot be displayed until the server makes a response;

the receiving unit being further configured to receive the second-type action data sent by the server; and the display unit being further configured to display the second-type action data received by the receiving unit.

A fourth aspect of the present disclosure provides a server, including:

a receiving unit, configured to receive a data requesting message sent by a terminal when the terminal displays first-type action data, the data requesting message being used for requesting second-type action data corresponding to a specified skill specified by a user, the first-type action data being data that can be displayed before the server makes a response, and the second-type action data being data that cannot be displayed until the server makes a response;

a determining unit, configured to determine, according to the data requesting message received by the receiving unit, the second-type action data corresponding to the specified skill; and a sending unit, configured to send, to the terminal, the second-type action data determined by the determining unit.

BRIEF DESCRIPTION OF THE DRAWINGS

To illustrate the technical solutions in the embodiments of the present invention more clearly, the following briefly introduces the accompanying drawings required for describing the embodiments of the present invention. Apparently, the accompanying drawings in the following description show merely some embodiments of the present invention, and a person skilled in the art may still derive other drawings from these accompanying drawings without creative efforts.

DESCRIPTION OF EMBODIMENTS

An embodiment of the present invention provides a data processing method, which can avoid the feeling of stickiness during a game process in a case where a network latency cannot be changed, thereby improving communication efficiency between a user and a game application. Embodiments of the present invention further provide a corresponding terminal, server, and system. The following separately describes the data processing method, terminal, server, and system in detail.

The technical solutions in the embodiments of the present application are described clearly and completely below with reference to the accompanying drawings in the embodiments of the present application. Apparently, the embodiments described are merely some embodiments rather than all embodiments of the present invention. All other embodiments obtained by a person skilled in the art based on the embodiments in the present invention without creative efforts belong to the protection scope of the present disclosure.

Figure 1:
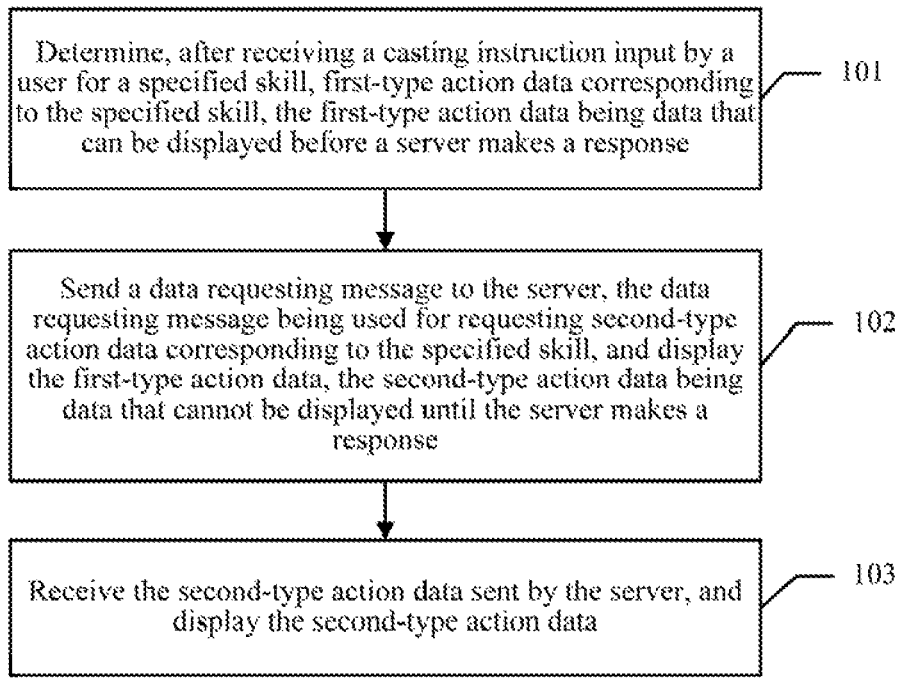
FIG. 1 is a schematic diagram of an embodiment data processing method according to the embodiments of the present invention.

Referring to FIG. 1, an embodiment of a data processing method provided by the embodiments of the present invention includes:

101: Determine, after receiving a casting instruction input by a user for a specified skill, first-type action data corresponding to the specified skill, the first-type action data being data that can be displayed before a server makes a response.

A player usually plays a role of a virtual character in an online game, and the character has corresponding skills such as boxing, kicking, slashing, and the player may cast different skills by pressing different keys on a keyboard; each skill generally may be divided into three parts, namely, Chant, OnCast, and OnHit, and all types of skills begin with the phase of "Chant" or "OnCast"; the phases of "Chant" and "OnCast" purely present properties, and can be executed without waiting for data replied by the server.

The first-type action data in this embodiment of the present invention is equivalent to "Chant" or "OnCast" data, for example: in one scenario, the virtual character of the player in the game needs to draw a sword and swing the sword downward to slash the enemy, the process of drawing a sword is equivalent to the first-type action data, namely, the "Chant" or "OnCast" data.

102: Send a data requesting message to the server, the data requesting message being used for requesting second-type action data corresponding to the specified skill, and display the first-type action data, the second-type action data being data that cannot be displayed until the server makes a response.

In this embodiment of the present invention, the second-type action data is action data with a substantial manifestation, and is equivalent to the part of "OnHit" in skill division. For example, in one game scenario, the virtual character of the player in the game needs to draw a sword and swing the sword downward to slash the enemy, where the action of swinging the sword downward to slash the enemy is the second-type action data.

The terminal starts displaying the first-type action data when requesting the second-type action data; in this way, the user almost does not feel any waiting time in terms of visual experience, and the terminal starts displaying data immediately after the user delivers the instruction, which reduces, in another form, a network latency.

103: Receive the second-type action data sent by the server, and display the second-type action data.

In this embodiment of the present invention, after a casting instruction input by a user for a specified skill is received, first-type action data corresponding to the specified skill is determined, the first-type action data being data that can be displayed before a server makes a response; a data requesting message is sent to the server, the data requesting message being used for requesting second-type action data corresponding to the specified skill, and the first-type action data is displayed, the second-type action data being data that cannot be displayed until the server makes a response; and the second-type action data sent by the server is received, and the second-type action data is displayed. Compared with the existing technology, when requesting the second-type action data from the server, the data processing method provided by this embodiment of the present invention may first display the first-type action data that can be displayed before the server makes a response, to avoid the feeling of stickiness during a game process, thereby improving communication efficiency between a user and a game application.

Optionally, on the basis of the embodiment corresponding to FIG. 1, in another embodiment of the data processing method provided by the embodiments of the present invention, when the first-type action data is displayed, the method may further include:

listening, to determine whether the second-type action data is received.

Optionally, on the basis of the optional embodiment corresponding to FIG. 1, in another embodiment of the data processing method provided by the embodiments of the present invention, the terminal buffers the second-type action data if it is detected by means of listening that the second-type action data has arrived before display of the first-type action data is finished.

Optionally, on the basis of the optional embodiment corresponding to FIG. 1, in another embodiment of the data processing method provided by the embodiments of the present invention, the terminal continues to display preset redundant action data associated with the first-type action data if it is detected by means of listening that the second-type action data has not arrived yet when display of the first-type action data is finished.

In the implementation of the present disclosure, by using a game scenario as an example, when the virtual character of the player in the game needs to draw a sword and swing the sword downward to slash the enemy, the terminal listens, when displaying data about the process of drawing a sword, to detect whether data about swinging the sword downward to slash the enemy arrives.

When it is detected by means of listening that the data about swinging the sword downward to slash the enemy has arrived, the terminal first buffers the data about swinging the sword downward to slash the enemy, and after finishing displaying the data about drawing a sword, the terminal directly displays the buffered data about swinging the sword downward to slash the enemy.

If the data about swinging the sword downward to slash the enemy has not arrived yet by the time display of the data about drawing a sword is finished, the terminal further displays the preset redundant action data associated with the data about drawing a sword, where the redundant action data may be picking up the sword with both hands and putting it in front, and if the data about swinging the sword downward to slash the enemy arrives at this time, the terminal may continue to display the data about swinging the sword downward to slash the enemy. In this way, the player does not feel any pause in the entire process in terms of visual experience, which reduces the feeling of freeze in the game process, where the feeling of freeze is used to describe a situation where the processing latency of a processing system consisting of a terminal and a server is unstable, and the processing is sometimes prompt and sometimes slow, which severely affects user experience.

In this way, the player neither has the feeling of stickiness nor the feeling of freeze during the game process; the game is made smoother, and the experience of the player when playing the game is also enhanced.

Figure 2:
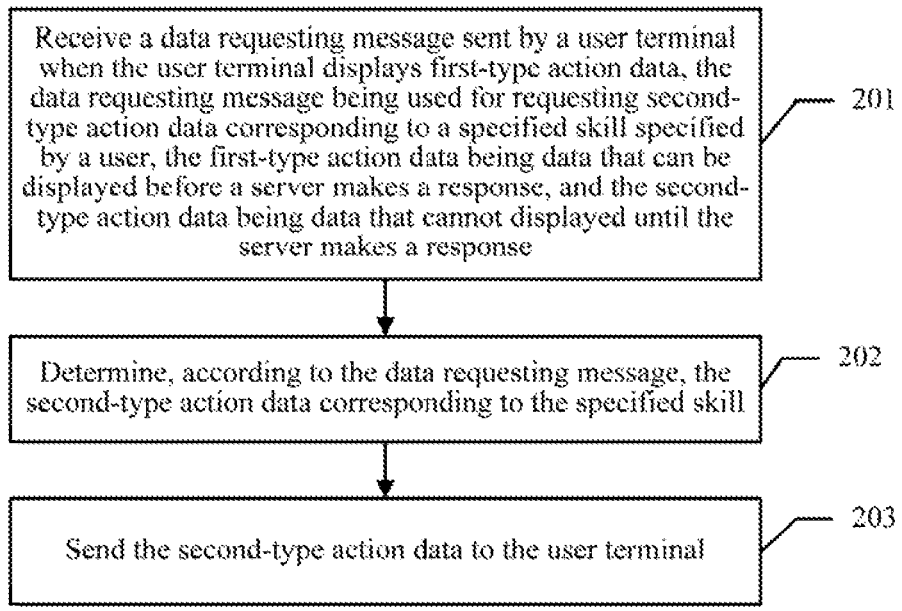
FIG. 2 is a schematic diagram of another embodiment of a data processing method according to the embodiments of the present invention.

Referring to FIG. 2, another embodiment of a data processing method provided by the embodiments of the present invention includes:

201: Receive a data requesting message sent by a terminal when the terminal displays first-type action data, the data requesting message being used for requesting second-type action data corresponding to a specified skill specified by a user, the first-type action data being data that can be displayed before a server makes a response, and the second-type action data being data that cannot be displayed until the server makes a response.

A player usually plays a role of a virtual character in an online game, and the character has corresponding skills such as boxing, kicking, slashing, and the player may cast different skills by pressing different keys on a keyboard; each skill generally may be divided into three parts, namely, Chant, OnCast, and OnHit, and all types of skills begin with the phase of "Chant" or "OnCast"; the phases of "Chant" and "OnCast" purely present properties, and can be executed without waiting for data replied by the server.

The first-type action data in this embodiment of the present invention is equivalent to "Chant" or "OnCast" data, for example: in one scenario, the virtual character of the player in the game needs to draw a sword and swing the sword downward to slash the enemy, the process of drawing a sword is equivalent to the first-type action data, namely, the "Chant" or "OnCast" data.

The second-type action data is action data with a substantial manifestation, and is equivalent to the part of "OnHit" in skill division. For example, in one game scenario, the virtual character of the player in the game needs to draw a sword and swing the sword downward to slash the enemy, where the action of swinging the sword downward to slash the enemy is the second-type action data.

The terminal starts displaying the first-type action data when requesting the second-type action data; in this way, the user almost does not feel any waiting time in terms of visual experience, and the terminal starts displaying data immediately after the user delivers the instruction, which reduces, in another form, a network latency.

202: Determine, according to the data requesting message, the second-type action data corresponding to the specified skill.

203: Send the second-type action data to the terminal.

In this embodiment of the present invention, a data requesting message sent by a terminal is received, the data requesting message being used for requesting second-type action data corresponding to a specified skill specified by a user, and the second-type action data being data that cannot be displayed until a server responds; the second-type action data corresponding to the specified skill is determined according to the data requesting message; and the second-type action data is sent to the terminal. As compared with the existing technology, in the data processing method provided by this embodiment of the present invention, when requesting the second-type action data from the server, the terminal may first display the first-type action data that can be displayed before the server makes a response, to avoid the feeling of stickiness during a game process, thereby improving communication efficiency between a user and a game application.

Optionally, on the basis of the embodiment corresponding to FIG. 2, in another embodiment of the data processing method provided by the embodiments of the present invention, after the receiving a data request message sent by a terminal, the method may further include:

buffering the data requesting message and recording an expiration time of the data requesting message when determining that the data requesting message arrives at the server ahead of time; and reading the data requesting message when the expiration time arrives.

In this embodiment of the present application, if presentation of second-type action data corresponding to a previous is not finished yet when the data requesting message arrives at the server ahead of time, the server buffers the current data requesting message and records the expiration time of the data requesting message. For example, a timer may be set, and when the timer expires, the server reads the data requesting message, determines the second-type action data corresponding to the specified skill according to the data requesting message, and sends the second-type action data to the terminal. The server buffers the request that arrives ahead of time, to avoid that the data requesting message arriving earlier than expected is rejected.

Before the presentation of the second-type action data corresponding to the previous request is finished, the server does not process the next request, because the server needs to control the frequency and rhythm for casting skills, to effectively prevent the player from cheating.

Figure 3:
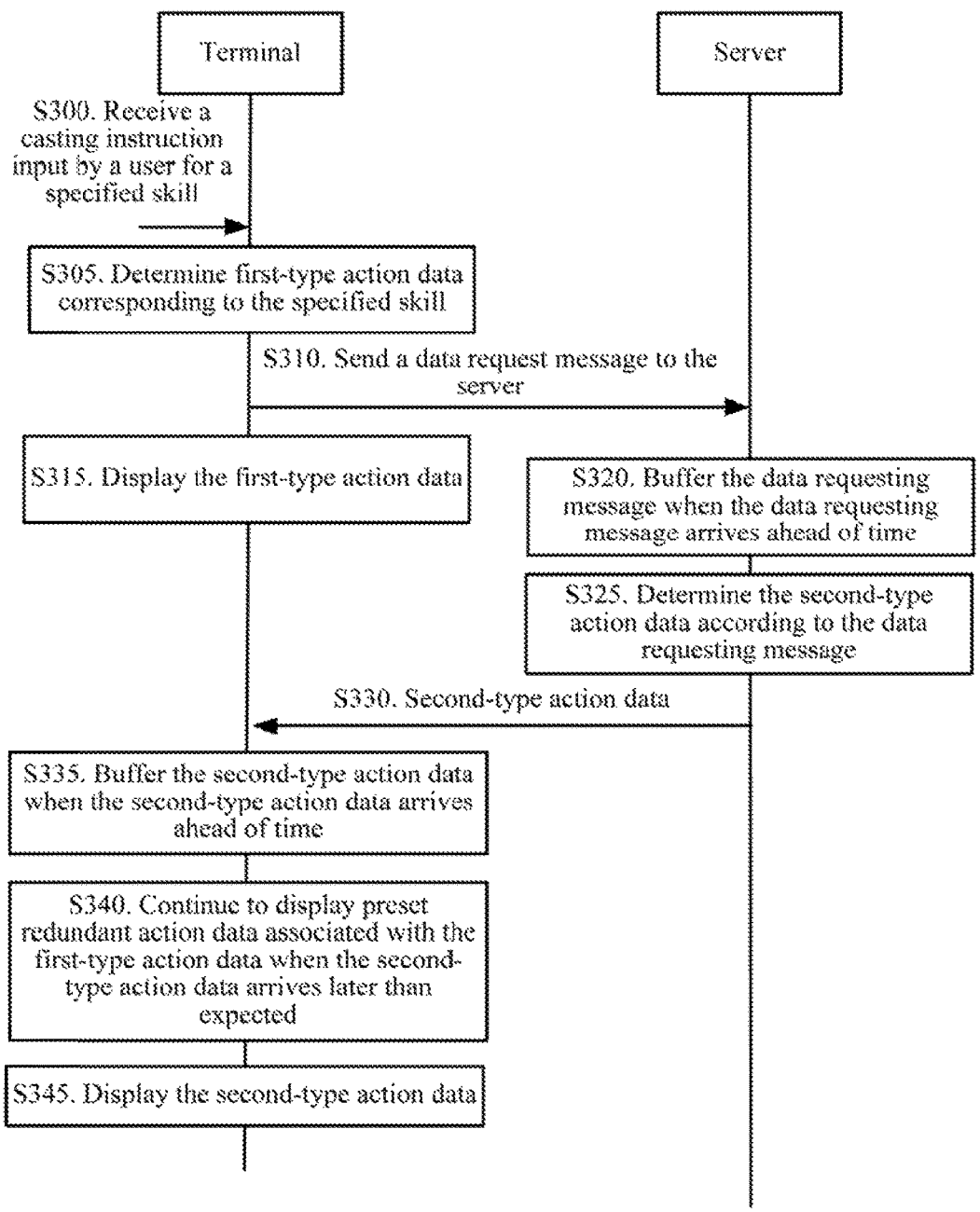
FIG. 3 is a schematic diagram of another embodiment of a data processing method according to the embodiments of the present invention.

Referring to FIG. 3, another embodiment of a data processing method provided by the embodiments of the present invention includes:

S300: A terminal receives a casting instruction input by a user for a specified skill.

S305: The terminal determines first-type action data corresponding to the specified skill.

The first-type action data is data that can be displayed before a server makes a response.

S310: The terminal sends a data request message to a server.

The data requesting message is used for requesting second-type action data corresponding to the specified skill, and the second-type action data is data that cannot be displayed until the server makes a response.

S315: The terminal displays the first-type action data.

The sequence of S310 and S315 is not limited.

S320: The server buffers the data requesting message when determining that the data requesting message arrives ahead of time.

325: Determine the second-type action data corresponding to the specified skill according to the data requesting message when an expiration time of the data requesting message arrives.

S330: The server sends the second-type action data to the terminal.

S335: The terminal buffers the second-type action data when determining that the second-type action data arrives ahead of time.

S340: Continue to display preset redundant action data associated with the first-type action data when the second-type action data arrives later than expected.

S345: Display the second-type action data.

Compared with the existing technology, when requesting the second-type action data from the server, the data processing method provided by this embodiment of the present invention may first display the first-type action data that can be displayed before the server makes a response, to avoid the feeling of stickiness during a game process, thereby improving communication efficiency between a user and a game application. Moreover, a bidirectional buffer technology and a data redundancy technology are used on the terminal and the server, thereby also resolving the feeling of freeze caused by the network instability.

Figure 4:
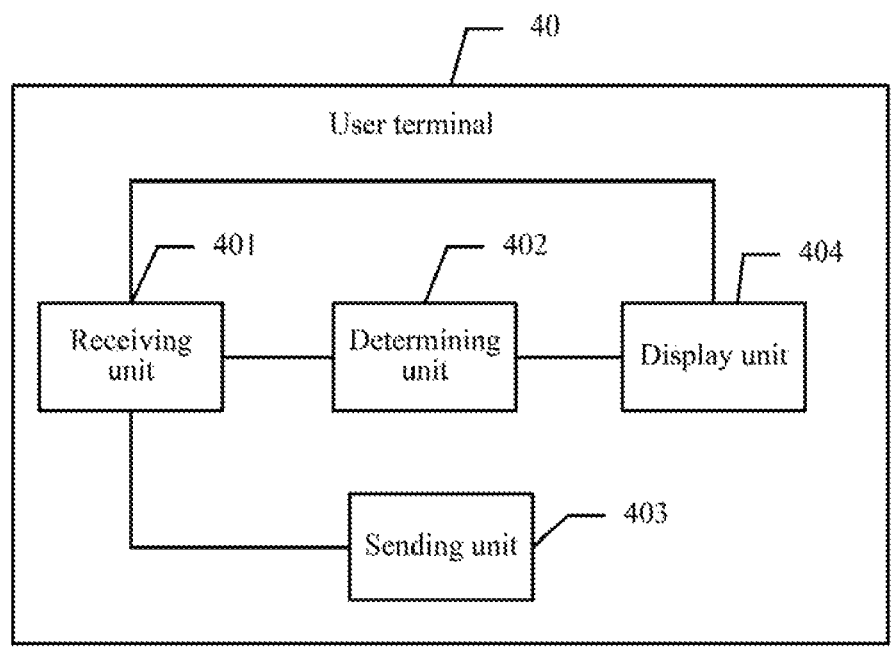
FIG. 4 is a schematic diagram of an embodiment of a terminal according to the embodiments of the present invention.

Referring to FIG. 4, an embodiment of a terminal 40 provided by the embodiments of the present invention includes:

a receiving unit 401, configured to receive a casting instruction input by a user for a specified skill;

a determining unit 402, configured to determine first-type action data corresponding to the specified skill received by the receiving unit 401, the first-type action data being data that can be displayed before a server makes a response;

a sending unit 403, configured to send a data requesting message to the server, the data requesting message being used for requesting second-type action data corresponding to the specified skill received by the receiving unit 401; and a display unit 404, configured to display the first-type action data determined by the determining unit 402, the second-type action data being data that cannot be displayed until the server makes a response;

the receiving unit 401 being further configured to receive the second-type action data sent by the server; and the display unit 404 being further configured to display the second-type action data received by the receiving unit 401.

In this embodiment, the receiving unit 401 receives a casting instruction input by a user for a specified skill; the determining unit 402 determines first-type action data corresponding to the specified skill received by the receiving unit 401, the first-type action data being data that can be displayed before a server makes a response; the sending unit 403 sends a data requesting message to the server, the data requesting message being used for requesting second-type action data corresponding to the specified skill received by the receiving unit 401; the display unit 404 displays the first-type action data determined by the determining unit 402, the second-type action data being data that cannot be displayed until the server makes a response; the receiving unit 401 further receives the second-type action data sent by the server; and the display unit 404 is further configured to display the second-type action data received by the receiving unit 401. Compared with the existing technology, when requesting the second-type action data from the server, the terminal provided by this embodiment of the present invention may first display the first-type action data that can be displayed before the server makes a response, to avoid the feeling of stickiness during a game process, thereby improving communication efficiency between a user and a game application.

Figure 5:
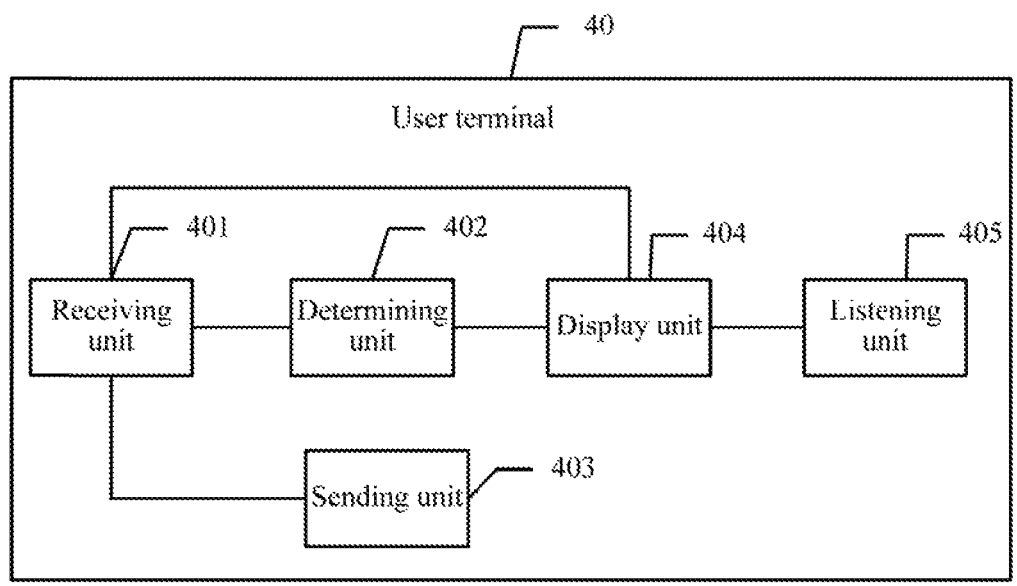
FIG. 5 is a schematic diagram of another embodiment of a terminal according to the embodiments of the present invention.

Optionally, on the basis of the embodiment corresponding to FIG. 4, referring to FIG. 5, in another embodiment of the terminal provided by the embodiments of the present invention, the terminal 40 further includes:

a listening unit 405, configured to listen, when the display unit 404 displays the first-type action data, to determine whether the second-type action data is received.

Figure 6:
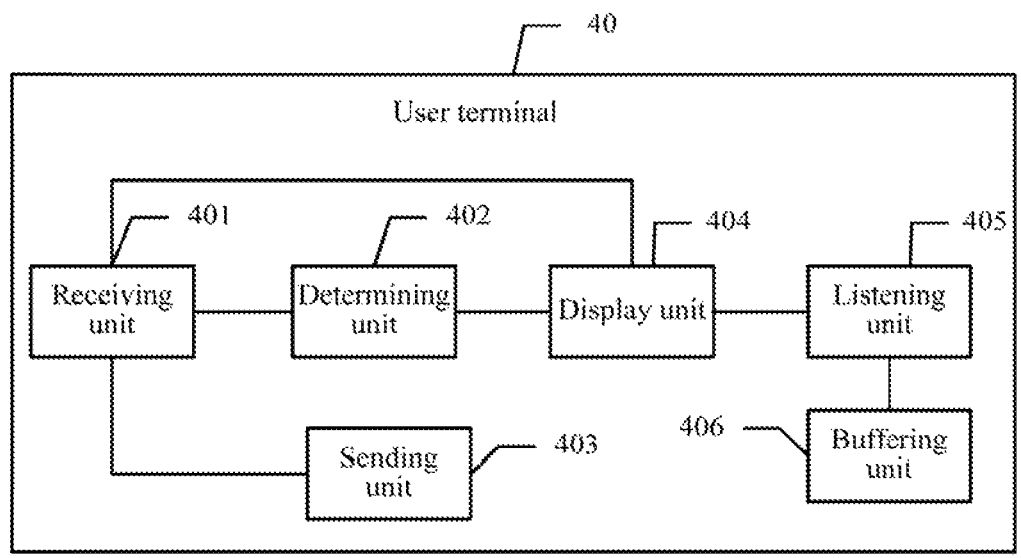
FIG. 6 is a schematic diagram of another embodiment of a terminal according to the embodiments of the present invention.

Optionally, on the basis of the embodiment corresponding to FIG. 5, referring to in FIG. 6, in another embodiment of the terminal provided by the embodiments of the present invention, the terminal 40 further includes:

a buffering unit 406, configured to buffer the second-type action data if the listening unit 405 detects by means of listening that the second-type action data has arrived before display of the first-type action data is finished.

Optionally, on the basis of the optional embodiment corresponding to FIG. 5, in another embodiment of the terminal provided by the embodiments of the present invention, the display unit is further configured to continue to display preset redundant action data associated with the first-type action data if the listening unit 405 detects by means of listening that the second-type action data has not arrived yet when display of the first-type action data is finished.

Figure 7:
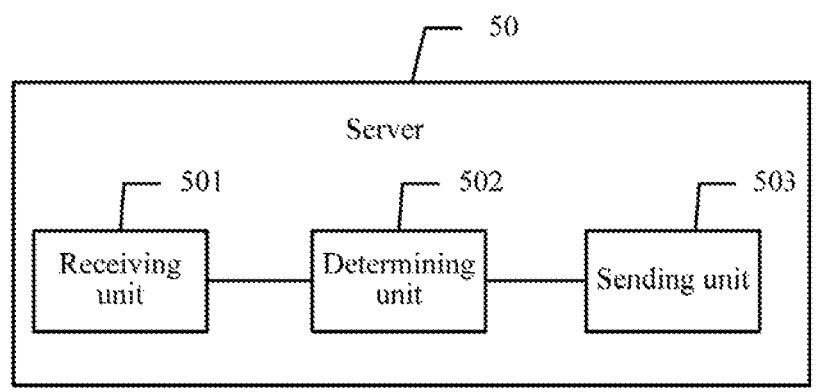
FIG. 7 is a schematic diagram of an embodiment of a server according to the embodiments of the present invention.

Referring to FIG. 7, an embodiment of a server 50 provided by the embodiments of the present invention includes:

a receiving unit 501, configured to receive a data requesting message sent by a terminal when the terminal displays first-type action data, the data requesting message being used for requesting second-type action data corresponding to a specified skill specified by a user, the first-type action data being data that can be displayed before the server makes a response, and the second-type action data being data that cannot be displayed until the server makes a response;

a determining unit 502, configured to determine, according to the data requesting message received by the receiving unit 501, the second-type action data corresponding to the specified skill; and a sending unit 503, configured to send, to the terminal, the second-type action data determined by the determining unit 502.

In this embodiment of the present invention, the receiving unit 501 receives a data requesting message sent by a terminal when the terminal displays first-type action data, the data requesting message being used for requesting second-type action data corresponding to a specified skill specified by a user, the first-type action data being data that can be displayed before the server makes a response, and the second-type action data being data that cannot be displayed until the server makes a response; the determining unit 502 determines, according to the data requesting message received by the receiving unit 501, the second-type action data corresponding to the specified skill; and the sending unit 503 sends, to the terminal, the second-type action data determined by the determining unit 502. As compared with the existing technology, with the server provided by this embodiment of the present invention, when requesting the second-type action data from the server, the terminal may first display the first-type action data that can be displayed before the server makes a response, to avoid the feeling of stickiness during a game process, thereby improving communication efficiency between a user and a game application.

Figure 8:
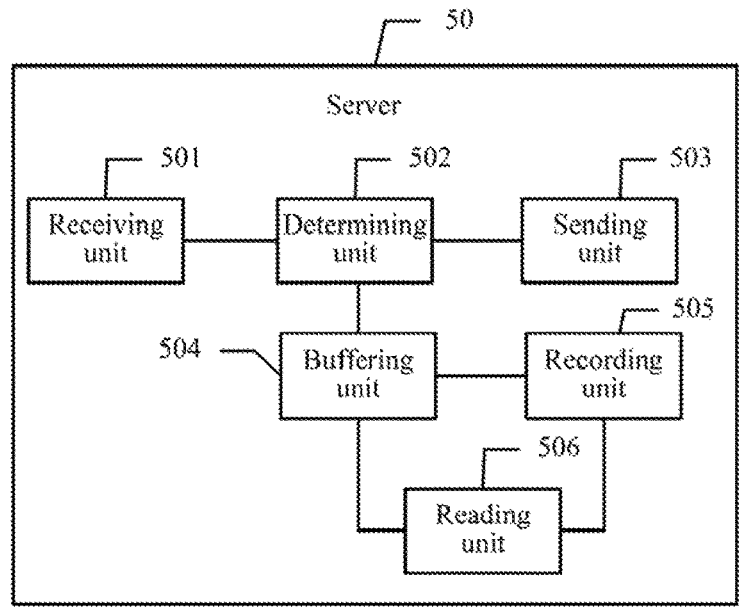
FIG. 8 is a schematic diagram of another embodiment of a server according to the embodiments of the present invention.

Optionally, on the basis of the embodiment corresponding to FIG. 7, referring to in FIG. 8, in another embodiment of the server provided by the embodiments of the present invention, the server 50 further includes:

a buffering unit 504, configured to buffer the data requesting message when the determining unit 502 determines that the data requesting message arrives at the server ahead of time;

a recording unit 505, configured to record an expiration time of the data requesting message buffered by the buffering unit 504; and a reading unit 506, configured to read the data requesting message buffered by the buffering unit 505 when the expiration time recorded by the recording unit 504 arrives.

Figure 9:
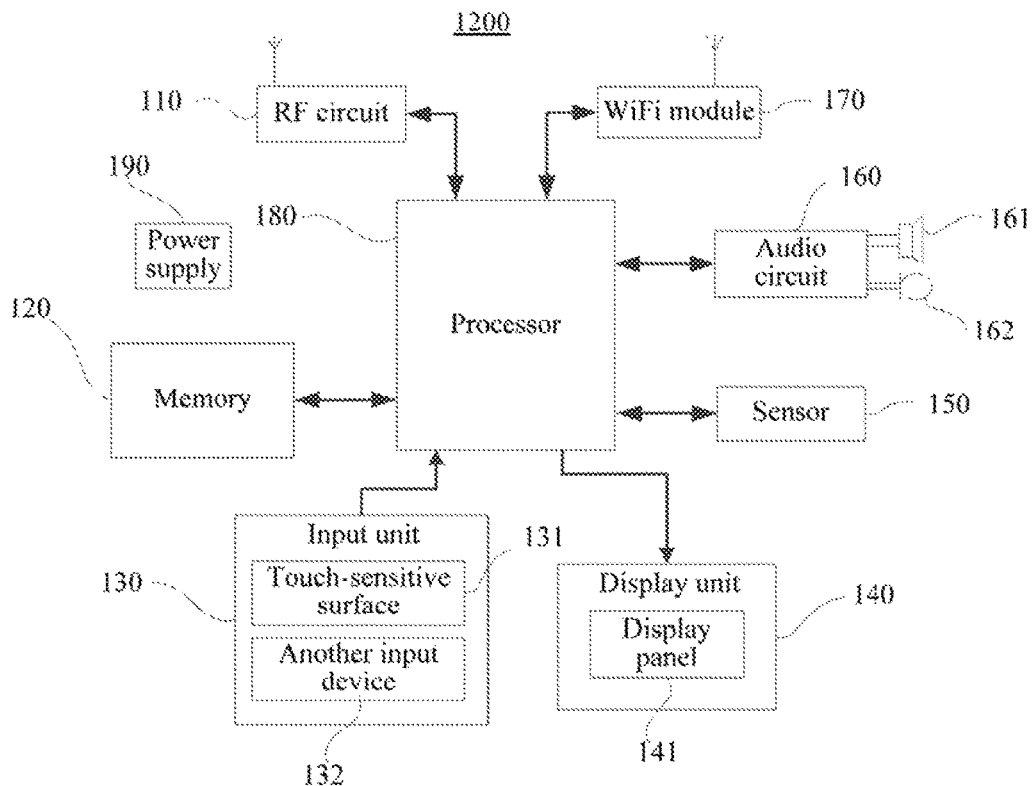
FIG. 9 is a schematic diagram of another embodiment of a terminal according to the embodiments of the present invention.

Refer to FIG. 9, which shows a schematic structural diagram of a terminal involved in the embodiments of the present invention. The terminal may be configured to implement the data processing method provided in the foregoing embodiments. Specifically:

The terminal 1200 may include components such as a radio frequency (RF) circuit 110, a memory 120 including one or more computer readable storage media, an input unit 130, a display unit 140, a sensor 150, an audio circuit 160, a Wireless Fidelity (WiFi) module 170, a processor 180 including one or more processing cores, and a power supply 190. A person skilled in the art may understand that the structure of the terminal shown in FIG. 9 does not constitute a limitation to the terminal, and the terminal may include more components or fewer components than those shown in the figure, or some components may be combined, or a different component deployment may be used.

The RF circuit 110 may be configured to receive and send signals during an information sending and receiving process or a call process. Particularly, the RF circuit 110 receives downlink information from a base station, then delivers the downlink information to the one or more processors 180 for processing, and sends related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 110 may also communicate with a network and another device by wireless communication. The wireless communication may use any communications standard or protocol, which includes, but is not limited to, Global System for Mobile Communication (GSM), General Packet Radio Service (GPRS), Code Division Multiple Access (CDMA), Wideband Code Division Multiple Access (WCDMA), Long Term Evolution, (LTE), e-mail, and Short Messaging Service (SMS).

The memory 120 may be configured to store a software program and module. The processor 180 runs the software program and module stored in the memory 120, to implement various functional applications and data processing. The memory 120 may mainly include a program storage area and a data storage area. The program storage area may store an operating system, an application program required by at least one function (such as a sound playback function and an image display function), and the like. The data storage area may store data (such as audio data and an address book) created according to use of the terminal 1200, and the like. In addition, the memory 120 may include a high-speed random access memory, and may also include a non-volatile memory, such as at least one magnetic disk storage device, a flash memory, or another volatile solid-state storage device. Accordingly, the memory 120 may further include a memory controller, so that the processor 180 and the input unit 130 access the memory 120.

The input unit 130 may be configured to receive input digit or character information, and generate a keyboard, mouse, joystick, optical, or track ball signal input related to the user setting and function control. Specifically, the input unit 130 may include a touch-sensitive surface 131 and another input device 132. The touch-sensitive surface 131, which may also be referred to as a touch screen or a touch panel, may collect a touch operation of a user on or near the touch-sensitive surface (such as an operation of a user on or near the touch-sensitive surface 131 by using any suitable object or accessory, such as a finger or a stylus), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 180. Moreover, the touch controller can receive and execute a command sent from the processor 180. In addition, the touch-sensitive surface 131 may be a resistive, capacitive, infrared, or surface acoustic wave type touch-sensitive surface. In addition to the touch-sensitive surface 131, the input unit 130 may further include the another input device 132. Specifically, the another input device 132 may include, but is not limited to, one or more of a physical keyboard, a functional key (such as a volume control key or a switch key), a track ball, a mouse, and a joystick.

The display unit 140 may be configured to display information input by the user or information provided for the user, and various graphical user interfaces of the terminal 1200. The graphical user interfaces may be formed by a graph, a text, an icon, a video, and any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, so as to determine the type of the touch event. Then, the processor 180 provides a corresponding visual output on the display panel 141 according to the type of the touch event. Although, in FIG. 9, the touch-sensitive surface 131 and the display panel 141 are used as two separate parts to implement input and output functions, in some embodiments, the touch-sensitive surface 131 and the display panel 141 may be integrated to implement the input and output functions.

The terminal 1200 may further include at least one sensor 150, such as an optical sensor, a motion sensor, and other sensors. Specifically, the optical sensor may include an ambient light sensor and a proximity sensor. The ambient light sensor may adjust luminance of the display panel 141 according to brightness of the ambient light. The proximity sensor may switch off the display panel 141 and/or backlight when the terminal 1200 is moved to the ear. As one type of motion sensor, a gravity acceleration sensor may detect magnitude of accelerations in various directions (generally on three axes), may detect magnitude and a direction of the gravity when static, and may be applied to an application that recognizes the attitude of a mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the terminal 1200, are not further described herein.

The audio circuit 160, a loudspeaker 161, and a microphone 162 may provide audio interfaces between the user and the terminal 1200. The audio circuit 160 may convert received audio data into an electric signal and transmit the electric signal to the loudspeaker 161. The loudspeaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal device by using the RF circuit 110, or outputs the audio data to the memory 120 for further processing. The audio circuit 160 may further include an earplug jack, so as to provide communication between a peripheral earphone and the terminal 1200.

WiFi is a short distance wireless transmission technology. The terminal 1200 may help, by using the WiFi module 170, the user to receive and send e-mails, browse web pages, access stream media, and so on, which provides wireless broadband Internet access for the user. Although FIG. 9 shows the WiFi module 170, it may be understood that the WiFi module is not a necessary component of the terminal 1200, and when required, the WiFi module may be omitted as long as the scope of the essence of the present disclosure is not changed.

The processor 180 is the control center of the terminal 1200, and is connected to various parts of the mobile phone by using various interfaces and lines. By running or executing the software program and/or module stored in the memory 120, and invoking data stored in the memory 120, the processor 180 performs various functions and data processing of the terminal 1200, thereby performing overall monitoring on the mobile phone. Optionally, the processor 180 may include one or more processing cores. Preferably, the processor 180 may integrate an application processor and a modem processor. The application processor mainly processes an operating system, a user interface, an application programs, and the like, and the modem processor mainly processes wireless communication. It can be understood that the foregoing modem processor may not be integrated in the processor 180.

The terminal 1200 may further include the power supply 190 (such as a battery) for supplying power to the components. Preferably, the power supply may be logically connected to the processor 180 through a power management system, thereby implementing functions such as charging, discharging, and power consumption management by using the power supply management system. The power supply 190 may further include any component, such as one or more direct current or alternating current power supplies, a re-charging system, a power supply fault detection circuit, a power supply converter or an inverter, and a power supply state indicator.

Although not shown in the figure, the terminal 1200 may further include a camera, a Bluetooth module, and the like, which are not further described herein. Specifically, in this embodiment, the display unit of the terminal is a touch screen display, and the terminal further includes a memory and one or more programs. The one or more programs are stored in the memory, and are configured to be executed by one or more processors, where the one or more programs include instructions for executing the following operations:

determining, after receiving a casting instruction input by a user for a specified skill, first-type action data corresponding to the specified skill, the first-type action data being data that can be displayed before a server makes a response;

sending a data requesting message to the server, the data requesting message being used for requesting second-type action data corresponding to the specified skill, and displaying the first-type action data, the second-type action data being data that cannot be displayed until the server makes a response; and receiving the second-type action data sent by the server, and displaying the second-type action data.

Assuming that the foregoing is a first possible implementation manner, in a second possible implementation manner provided on the basis of the first possible implementation manner, the memory of the terminal further includes an instruction for executing the following operation:

listening, to determine whether the second-type action data is received.

In a third possible implementation manner provided on the basis of the second possible implementation manner, the memory in the terminal further includes an instruction for executing the following operation:

buffering the second-type action data if it is detected by means of listening that the second-type action data has arrived before display of the first-type action data is finished.

In a fourth possible implementation manner provided on the basis of the second possible implementation manner, the memory in the terminal further includes an instruction for executing the following operation:

continuing to display preset redundant action data associated with the first-type action data if it is detected by means of listening that the second-type action data has not arrived yet when display of the first-type action data is finished.

In conclusion, the terminal provided by this embodiment of the present invention determines, after receiving a casting instruction input by a user for a specified skill, first-type action data corresponding to the specified skill, the first-type action data being data that can be displayed before a server makes a response; sends a data requesting message to the server, the data requesting message being used for requesting second-type action data corresponding to the specified skill, and displays the first-type action data, the second-type action data being data that cannot be displayed until the server makes a response; and receives the second-type action data sent by the server, and displays the second-type action data. Compared with the existing technology, when requesting the second-type action data from the server, the data processing method provided by this embodiment of the present invention may first display the first-type action data that can be displayed before the server makes a response, to avoid the feeling of stickiness during a game process, thereby improving communication efficiency between a user and a game application.

As another aspect, another embodiment of the present invention further provides a computer readable storage medium. The computer readable storage medium may be a computer readable storage medium included in the memory of the foregoing embodiment, or a separate computer readable storage medium that exists along and is not installed in a terminal. The computer readable storage medium has one or more programs stored therein, where the one or more programs are executed by one or more processors to implement a data processing method, and the method includes:

determining, after receiving a casting instruction input by a user for a specified skill, first-type action data corresponding to the specified skill, the first-type action data being data that can be displayed before a server makes a response;

sending a data requesting message to the server, the data requesting message being used for requesting second-type action data corresponding to the specified skill, and displaying the first-type action data, the second-type action data being data that cannot be displayed until the server makes a response; and receiving the second-type action data sent by the server, and displaying the second-type action data.

Assuming that the foregoing is a first possible implementation manner, in a second possible implementation manner provided on the basis of the first possible implementation manner, when the first-type action data is displayed, the method further includes:

listening, to determine whether the second-type action data is received.

In a third possible implementation manner provided on the basis of the second possible implementation manner, the terminal buffers the second-type action data if it is detected by means of listening that the second-type action data has arrived before display of the first-type action data is finished.

In a fourth possible implementation manner provided on the basis of the second possible implementation manner, the terminal continues to display preset redundant action data associated with the first-type action data if it is detected by means of listening that the second-type action data has not arrived yet when display of the first-type action data is finished.

Figure 10:
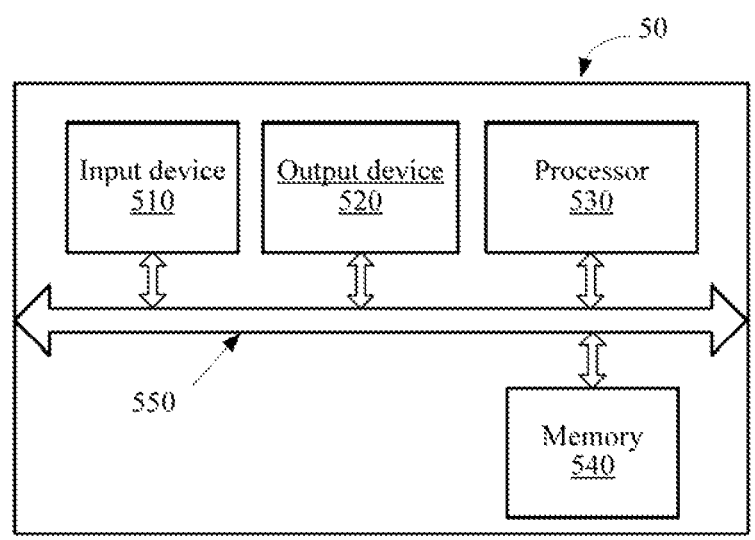
FIG. 10 is a schematic diagram of another embodiment of a server according to the embodiments of the present invention.

FIG. 10 is a schematic structural diagram of a server 50 according to an embodiment of the present invention. The server 50 may include an input device 510, an output device 520, a processor 530, and a memory 540.

The memory 540 may include a read-only memory (ROM) and a random access memory (RAM), and provides instructions and data for the processor 530. A part of the memory 540 may further include a non-volatile random access memory (NVRAM).

The memory 540 stores the following elements, and can execute modules or data structures, or a subset thereof, or an extended set thereof:

an operation instruction: including various operation instructions for implementing various operations; and an operating system: including various system programs for implementing basic services and processing hardware-based tasks.

In this embodiment of the present invention, the processor 530 invokes an operation instruction stored in the memory 540 (where the operation instruction may be stored in the operating system), to execute the following operations:

receiving, by the input device 51, a data requesting message sent by a terminal when the terminal displays first-type action data, the data requesting message being used for requesting second-type action data corresponding to a specified skill specified by a user, the first-type action data being data that can be displayed before the server makes a response, and the second-type action data being data that cannot be displayed until the server makes a response; determining, according to the data requesting message, the second-type action data corresponding to the specified skill; and sending, by the output device 520, the second-type action data to the terminal.

In this embodiment of the present invention, when requesting the second-type action data from the server, the terminal may first display the first-type action data that can be displayed before the server makes a response, to avoid the feeling of stickiness during a game process, thereby improving communication efficiency between a user and a game application.

The processor 530 controls operation of the server 50, and the processor 530 may also be referred to as a CPU. The memory 540 may include a ROM and a RAM, and provides instructions and data for the processor 530. A part of the memory 540 may further include an NVRAM. In a specific application, the components of the server 50 may be coupled with each other by using a bus system 550, where in addition to a data bus, the bus system 550 may further include a power supply bus, a control bus, a status signal bus, and the like. For the clarity of description, all buses are marked as the bus system 550 in the figure.

The method disclosed in the foregoing embodiment of the present invention may be applied to the processor 530, or implemented by the processor 530. The processor 530 may be an integrated circuit chip and has a signal processing capability. In an implementation process, each of the foregoing method may be implemented by an integrated logic circuit of hardware in the processor 530 or by a software-form instruction. The processor 530 may be a general-purpose processor, a digital signal processor (DSP), an application specific integrated circuit (ASIC), a field programmable gate array (FPGA) or another programmable logic device, a discrete gate or transistor logic device, or a discrete hardware component, and can implement or execute each method, step, and logic block diagram disclosed in the embodiments of the present invention. The general-purpose processor may be a microprocessor, alternatively, the processor may also be any regular processor, or the like. Steps of the method disclosed with reference to the embodiment of the present invention may be directly implemented by a hardware decoding processor, or implemented by a combination of hardware in the decoding processor and a software module. The software module may be located in a mature storage medium in the field, such as a RAM, a flash memory, a ROM, a programmable read only memory or an electrically erasable programmable memory, or a register. The storage medium is located in the memory 540, and the processor 530 reads information in the memory 540, to implement the foregoing method steps together with hardware.

Optionally, the memory 540 is configured to buffer the data requesting message when the processor 530 determines that the data requesting message arrives at the server ahead of time; and the processor 530 is configured to record an expiration time of the data requesting message, and reads the data requesting message when the expiration time arrives.

Figure 11:
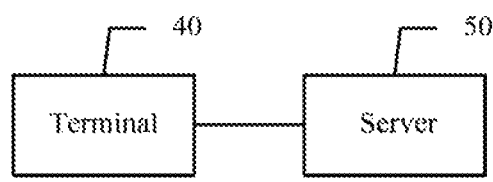
FIG. 11 is a schematic diagram of an embodiment of a data processing system according to the embodiments of the present invention.

Referring to FIG. 11, an embodiment of a data processing system provided by the embodiments of the present invention includes a terminal 40 and a server 50.

The terminal 40 is configured to determine, after receiving a casting instruction input by a user for a specified skill, first-type action data corresponding to the specified skill, the first-type action data being data that can be displayed without waiting for a response of a server; send a data requesting message to the server, the data requesting message being used for requesting second-type action data corresponding to the specified skill; and display the first-type action data, the second-type action data being data that cannot be displayed until the server makes a response.

The server 50 is configured to receive the data requesting message sent by the terminal, determine the second-type action data corresponding to the specified skill according to the data requesting message, and send the second-type action data to the terminal.

The terminal 40 is configured to receive the second-type action data sent by the server, and display the second-type action data.

A person of ordinary skill in the art can understand that all or some steps of the methods according to the foregoing embodiments may be implemented by a program instructing relevant hardware. The program may be stored in a computer readable storage medium, and the storage medium may include a ROM, a RAM, a magnetic disk, an optical disc, or the like.

The data processing method, terminal, server, and system provided by the embodiments of the present invention are described in detail above. Specific examples are used herein to illustrate principles and implementation manners of the present disclosure. The above description of the embodiments is merely for helping understand the method and core idea of the present disclosure. Meanwhile, a person of ordinary skill in the art may make alterations to the specific implementation manner and application range according to the idea of the present disclosure. In conclusion, the content of the specification shall not be construed as a limitation to the present disclosure.

What is claimed is:

1. A data processing method, comprising:
    at a terminal having a processor and a memory storing programs executed by the processor,
    receiving a casting instruction for a specified skill of a virtual character from a user;
    determining a first action data corresponding to the specified skill of the virtual character;
    sending a requesting message to a server during a process of displaying the first action data, the requesting message being used for requesting a second action data corresponding to the specified skill of the virtual character;
    receiving the second action data from the server; and
    displaying the second action data.

2. The data processing method according to claim 1, further comprising:
    listening to determine that the second action data is received during the process of displaying the first action data.

3. The data processing method according to claim 2, further comprising:
    buffering the second action data before the displaying of the first action data is finished.

4. The data processing method according to claim 1, further comprising:
    listening to determine that no second action data is received until the displaying of the first action data is finished; and
    displaying preset redundant action data associated with the first action data.

5. A data processing method, comprising:
    at a server having one or more processors and a memory storing programs executed by the one or more processors;
    receiving, a data requesting message from a terminal which is displaying a first action data corresponding to a specified skill of a virtual character, the data requesting message being used for requesting a second action data corresponding to the specified skill of the virtual character;
    determining the second action data corresponding to the specified skill of the virtual character in response to the data requesting message; and
    sending the second action data to the terminal.

6. The data processing method according to claim 5, wherein after the process of receiving the data requesting message from the terminal, the method further comprises:
    determining that a presentation of a second action data corresponding to a previous request is not finished;
    buffering the data requesting message;
    recording an expiration time of the data requesting message; and
    reading the data requesting message when the expiration time expires.

7. A terminal, comprising:
    a processor; and
    a memory storing program instructions, wherein the processor executes the program instructions to:
        receive a casting instruction for a specified skill of a virtual character from a user;
        determine a first action data corresponding to the specified skill of the virtual character;
        send a requesting message to a server during a process of displaying the first action data, the requesting message being used for requesting a second action data corresponding to the specified skill of the virtual character;
        receive the second action data from the server; and
        display the second action data.

8. The terminal according to claim 7, wherein the processor executes the program instructions further to: listen to determine that the second action data is received during the process of displaying the first action data.

9. The terminal according to claim 8, wherein the processor executes the program instructions further to:
    buffer the second action data before the displaying of the first action data is finished.

10. The terminal according to claim 8, wherein the processor executes the program instructions further to:
    listen to determine that no second action data is received until the displaying of the first action data is finished; and
    display preset redundant action data associated with the first action data.

* * * * *